(12) United States Patent
Liu et al.

(10) Patent No.: US 11,864,275 B2
(45) Date of Patent: *Jan. 2, 2024

(54) SYSTEM FOR DATA TRANSMISSION

(71) Applicant: ZTE CORPORATION, Guangdong (CN)

(72) Inventors: Zhuang Liu, Shenzhen (CN); Yin Gao, Shenzhen (CN); He Huang, Shenzhen (CN); Yang Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/987,762

(22) Filed: Nov. 15, 2022

(65) Prior Publication Data
US 2023/0208558 A1 Jun. 29, 2023

Related U.S. Application Data

(63) Continuation of application No. 16/493,731, filed as application No. PCT/CN2018/078826 on Mar. 13, 2018, now Pat. No. 11,533,775.

(30) Foreign Application Priority Data

Mar. 13, 2017 (CN) .......................... 201710147146.2

(51) Int. Cl.
*H04W 80/02* (2009.01)
*H04L 1/1812* (2023.01)
(Continued)

(52) U.S. Cl.
CPC ............... *H04W 80/02* (2013.01); *H04L 1/08* (2013.01); *H04L 1/1812* (2013.01);
(Continued)

(58) Field of Classification Search
CPC ..... H04W 76/20; H04W 80/02; H04W 28/04; H04W 28/06; H04W 36/00; H04W 36/02;
(Continued)

(56) References Cited

U.S. PATENT DOCUMENTS

| 8,862,170 B2 | 10/2014 | Lee et al. |
| 2009/0040982 A1 | 2/2009 | Ho et al. |

(Continued)

FOREIGN PATENT DOCUMENTS

| CN | 101779493 A | 7/2010 |
| CN | 102056226 A | 5/2011 |

(Continued)

OTHER PUBLICATIONS

CATT "Consideration on intra-gNB mobility" Jan. 17-19, 2016, 3GPP TSG RAN WG2 Meeting AdHoc-R3-170130.

(Continued)

*Primary Examiner* — Kan Yuen
(74) *Attorney, Agent, or Firm* — Knobbe, Martens, Olson & Bear, LLP

(57) ABSTRACT

Provided are a data transmission method and apparatus and a computer storage medium. The method may include: a source Distributed Unit (DU) reports a packet data convergence protocol (PDCP) transmission state report to a source Centralized Unit (CU), where the PDCP transmission state report enables the CU to determine which PDCP protocol data unit (PDU) data is not successfully received by a UE; and the PDCP PDU data which is not successfully received by the UE are retransmitted to the UE via a target DU.

3 Claims, 12 Drawing Sheets the CU receives the PDCP transmission status report, and the PDCP status report enables the CU to determine which PDCP PDU data is not successfully received by the UE — 801 the CU acquires the PDCP PDU data that is not successfully received by the UE according to the PDCP transmission status report and resends the acquired PDCP PDU data to the target DU, and retransmits the PDCP PDU data that is not successfully received by the UE to the UE via the target DU — 802

(51) Int. Cl.
*H04W 28/04* (2009.01)
*H04W 28/06* (2009.01)
*H04W 76/20* (2018.01)
*H04L 1/08* (2006.01)

(52) U.S. Cl.
CPC ........... *H04W 28/04* (2013.01); *H04W 28/06* (2013.01); *H04W 76/20* (2018.02)

(58) Field of Classification Search
CPC ... H04W 36/023; H04W 36/08; H04W 36/18; H04W 88/10; H04W 36/0016; H04W 36/0072; H04L 1/08; H04L 1/18; H04L 1/1812
See application file for complete search history.

(56) References Cited

U.S. PATENT DOCUMENTS

| | | | |
|---|---|---|---|
| 2017/0359848 A1 | 12/2017 | Tenny et al. | |
| 2018/0083688 A1* | 3/2018 | Agiwal | H04M 3/537 |
| 2018/0376380 A1* | 12/2018 | Leroux | H04W 76/27 |
| 2019/0166526 A1* | 5/2019 | Xu | H04W 76/11 |
| 2019/0223251 A1* | 7/2019 | Jiang | H04W 76/11 |
| 2019/0387444 A1 | 12/2019 | Byun et al. | |
| 2020/0396663 A1 | 12/2020 | Byun et al. | |

FOREIGN PATENT DOCUMENTS

| | | | |
|---|---|---|---|
| CN | 104066128 A | 9/2014 | |
| CN | 106162730 A | 11/2016 | |
| WO | WO 2009/102166 A2 | 8/2009 | |
| WO | WO 2015/018653 A1 | 2/2015 | |

OTHER PUBLICATIONS

CATT "Discussion on support of multi-connectivity for option 2 and option 3-1" Jan. 17-19, 2016, 3GPP TSG RAN WG3 Meeting #Adhoc-R3-170125.
First Search Report for CN 201710147146.2.
First Office Action for CN 201710147146.2.
CATT, China Telecom, "Considerations on RAN function split between CU and Du", 3GPP TSG RAN WG3 Meeting #94, Reno, Nevada, USA, Nov. 14-18, 2016. [retrieved on Nov. 14, 2016].
ZTE, "Consideration on RRC Message Transmission", 3GPP TSG RAN WG3 NR Adhoc, R3-170102—5 pages (Jan. 19, 2017).
Huawei et al., "Reconsideration of Higher Layer Split Options", 3GPP TSG-RAN3 Meeting NR#1, R3-170173—3 pages (Jan. 19, 2017).
Altiostar Networks, "High-Layer Split Option", 3GPP TSG RAN WG3 Meeting #95, R3-170589—3 pages (Feb. 17, 2017).
Samsung, KT, SK Telecom, "Intra-CU/Inter-DU Handover support", 3GPP TSG-RAN WG3 Meeting #96, Hangzhou, P.R. China, May 15-19, 2017 [retrieved on May 14, 2017].
International Search Report of corresponding PCT Application No. PCT/CN2018/078826—6 pages (dated May 30, 2018).
Extended European Search Report issue in application No. 18766862.9 dated Oct. 20, 2020.

* cited by examiner the target DU acquires PDCP PDU data which is not successfully received by the UE and retransmits the acquired PDCP PDU data to the UE — 601

FIG. 6 first receiving unit 71 first sending unit 72

FIG. 7 the CU receives the PDCP transmission status report, and the PDCP status report enables the CU to determine which PDCP PDU data is not successfully received by the UE — 801 the CU acquires the PDCP PDU data that is not successfully received by the UE according to the PDCP transmission status report and resends the acquired PDCP PDU data to the target DU, and retransmits the PDCP PDU data that is not successfully received by the UE to the UE via the target DU — 802

FIG. 8

SYSTEM FOR DATA TRANSMISSION

CROSS-REFERENCE TO RELATED APPLICATIONS

The present application is a continuation of U.S. patent application Ser. No. 16/493,731 filed on Sep. 12, 2019, which is a U.S. national stage application filed under 35 U.S.C. § 371 of International Patent Application No. PCT/CN2018/078826, filed Mar. 13, 2018, which claims priority to Chinese Patent Application No. 201710147146.2 filed Mar. 13, 2017, the disclosures of which are incorporated herein by reference in their entireties.

TECHNICAL FIELD

The present disclosure relates to the field of wireless communications, and specifically, to a data transmission system.

BACKGROUND

The fifth Generation (5G, 5th Generation) network architecture has innovation and networking flexibility. A Building Base Band Unit (BBU) on a radio access network side in the 5G network is separated into two functional entities: a Centralized Unit (CU) and a Distributed Unit (DU), and multiple DUs are controlled by the CU, so that a centralized baseband processing of cloud architecture is realized and distributed services are provided to remote-end users. In the CU-DU separation network architecture, a latency-insensitive network function is placed in the CU, a latency-sensitive network function is placed in the DU, and transmission and connection between the CU and the DU are achieved via an ideal/non-ideal fronthaul, so as to realize the function of multipoint collaboration, and support flexible networking of separate or integrated stations.

Under the CU-DU architecture of 5G, downlink RLC PDU data loss is likely to occur when the user switches among DUs under the same CU during the data transmission process in the acknowledged mode, which is a problem to be solved urgently.

SUMMARY

In order to solve the above-mentioned technical problems, embodiments of the present disclosure provides a data transmission method and apparatus.

The disclosure provides the following scheme:

In a data transmission method, a source DU reports a packet data convergence protocol (PDCP) transmission status report to a CU, the PDCP transmission status report enables the Centralized Unit (CU) to determine which PDCP protocol data unit (PDU) data is not successfully received by a UE, and the PDCP PDU data which is not successfully received by the UE are retransmitted to the UE via a target DU.

A data transmission apparatus is provided, including: a triggering unit, configured for reporting a PDCP transmission status report to a CU, and the PDCP transmission status report enables the CU to determine which PDCP PDU data is not successfully received by a UE and retransmits the PDCP PDU data which is not successfully received by the UE to the UE via the target DU.

A data transmission apparatus includes: a processor and a memory. And the memory is configured to store computer-executable instructions which, when executed by the processor, implement a step of: the PDCP transmission status report is reported to the CU and enables the CU to determine which PDCP PDU data is not successfully received by the UE, and the PDCP PDU data which is not successfully received by the UE are retransmitted to the UE via the target DU.

A data transmission method is provided, including: the target DU acquires the PDCP PDU data which is not successfully received by the UE and retransmits the acquired PDCP PDU data to the UE.

A data transmission apparatus is provided, including: a first receiving unit, configured to acquire the PDCP PDU data which is not successfully received by the UE; a first sending unit, configured to retransmit the PDCP PDU data which is not successfully received by the UE to the UE.

A data transmission apparatus is provided, including: a processor and a memory. And the memory is configured to store computer-executable instructions which, when executed by the processor, implement a step of: the PDCP PDU data which is not successfully received by the UE are acquired and retransmitted to the UE.

A data transmission method is provided, including: the CU receives the PDCP transmission status report, and the PDCP status report enables the CU to determine which PDCP PDU data is not successfully received by a UE; and the CU acquires the PDCP PDU data which is not successfully received by the UE according to the PDCP transmission status report and retransmits the acquired PDCP PDU data to the target DU.

A data transmission apparatus is provided, including: a second receiving unit, configured to receive the PDCP transmission status report, and the PDCP status report enables the CU to determine which PDCP PDU data is not successfully received by the UE; a second sending unit, configured to acquire the PDCP PDU data which is not successfully received by the UE and resend the acquired PDCP PDU data to a target DU according to the PDCP transmission status report.

A data transmission apparatus is provided, including a processor and a memory and the memory is configured to store computer-executable instructions which, when executed by the processor, implement steps of: the PDCP transmission status report is received, and the PDCP status report enables the CU to determine which PDCP PDU data is not successfully received by the UE; and the PDCP PDU data which is not successfully received by the UE are acquired and resent to the target DU according to the PDCP transmission status report.

In addition, the embodiments of the present application further provide a computer storage medium configured to store computer-executable instructions for executing the above-mentioned data transmission method applied to the UE when executed.

In addition, the embodiments of the present application further provide a computer storage medium configured to store computer-executable instructions for executing the above-mentioned data transmission method applied to the CU when executed.

In addition, the embodiments of the present application further provide a computer storage medium configured to store computer-executable instructions for executing the above-mentioned data transmission method applied to the DU when executed.

The method provided by the present disclosure includes the following effects:

In at least one embodiment of the present application, the UE actively triggers the PDCP report and sends the PDCP report to the target DU, and the target DU may acquire the PDCP PDU data which is not successfully received by the UE according to the PDCP report and retransmit the acquired PDCP PDU data to the UE, so that a problem that the downlink PDCP PDU data are easily lost due to the switching among DUs under the same CU is solved, and a seamless switching requirement of a user is satisfied.

In at least one embodiment of the present application, the UE actively triggers the RLC report and sends the RLC report to the target DU, and the target DU may acquire the RLC PDU data which is not successfully received by the UE according to the RLC report and retransmit the acquired RLC PDU data to the UE, so that a problem that the downlink RLC PDU data are easily lost due to the switching among DUs under the same CU is solved, and a seamless switching requirement of a user is satisfied.

In at least one embodiment of the application, not only the problem that downlink data are easily lost due to the switching among the DUs under the same CU, but the problem that the retransmission latency of the downlink data is large is effectively solved.

Other features and advantages of the present application will be elaborated hereinafter in the description and, moreover, partially become apparent from the description, or will be understood through implementation of the present application. The object and other advantages of the present application may be implemented and obtained through structures set forth in the description, claims and drawings.

BRIEF DESCRIPTION OF THE DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

FIG. 6 is a flowchart of a method applied to a DU according to embodiment 1 of the present application;

FIG. 7 is a schematic structural diagram of a data transmission apparatus applied to the DU according to embodiment 1 of the present application;

FIG. 8 is a flowchart of a method applied to the CU according to embodiment 1 of the present application;

DETAILED DESCRIPTION

Objects, technical solutions and advantages of the present application will be clearer from a detailed description of embodiments of the present application in conjunction with the drawings. It is to be noted that if not in collision, the embodiments and features therein in the present application may be combined with each other.

The steps shown in the flowcharts among the drawings may be performed by a computer system such as a group of computers capable of executing instructions. Although logical sequences are shown in the flowcharts, in some cases, the shown or described steps may be performed in sequences different from those described herein.

In related technology, there are two schemes, option 2 and option 3, for an architecture of CU-DU high-layer protocol separation.

Figure 1:
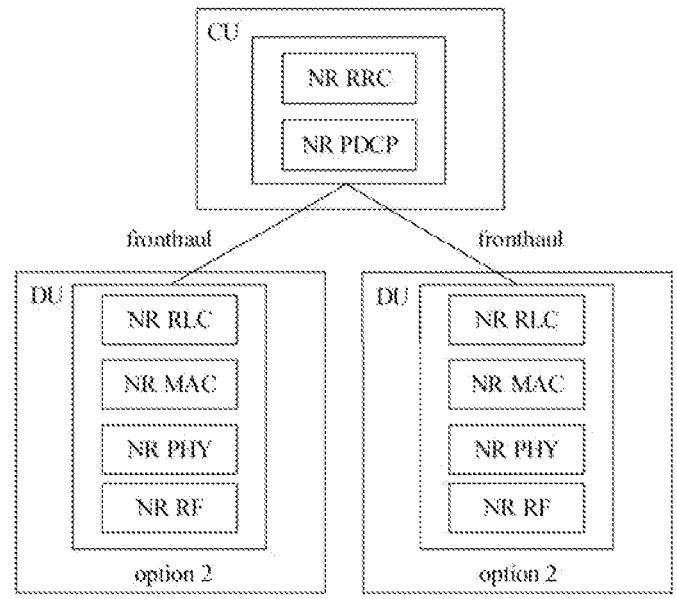
FIG. 1 is a schematic diagram of a CU-DU separation of option 2 of a scheme in related technology.

As shown in FIG. 1, option 2 is to perform a division between a Packet Data Convergence Protocol (PDCP) and a Radio Link Control (RLC), i.e., the PDCP and a layer above PDCP are placed in a CU, and the RLC and entities below the RLC are placed in a DU.

Figure 2:
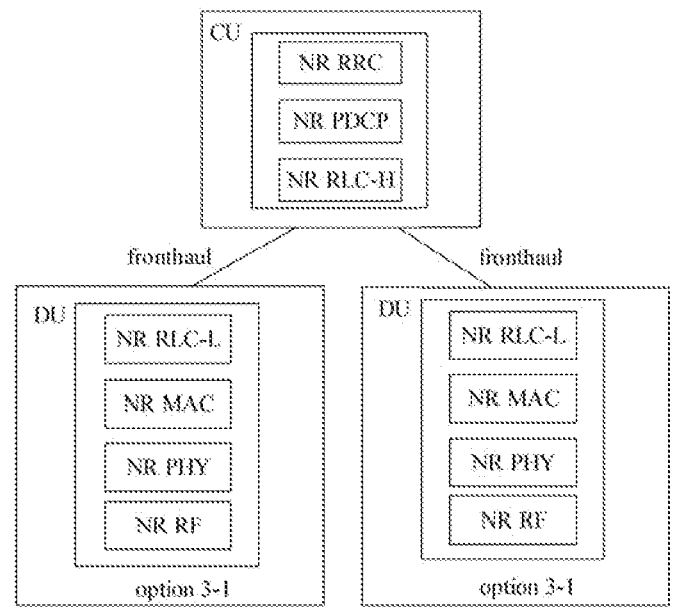
FIG. 2 is a schematic diagram of a CU-DU separation of option 3 of the scheme in related technology.

As shown in FIG. 2, option 3 is to perform a division inside the RLC, i.e., a part of RLC functions, the PDCP and a layer above the PDCP are placed in the CU, and a part of RLC functions and entities below the RLC are placed in the DU. A part of the RLC in the CU is defined herein as RLC-H and a part of the RLC in the DU is defined as RLC-L. The RLC-H function is a latency-insensitive function, including an Automatic Repeat Request (ARQ), a non-scheduling related segmentation and/or concatenation. The RLC-L function is a latency-sensitive function (e.g., a real-time segmentation function), and processes a Protocol Data Unit (PDU) data packet from a CU in real-time according to an MAC scheduling indication.

Figure 3:
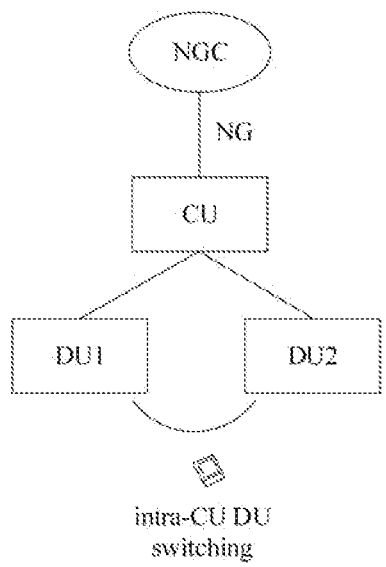
FIG. 3 is a schematic diagram of DU switching under the control of an identical CU in related technology.

As shown in FIG. 3, due to the centralized deployment of CU, a CU of a serving cell may connect multiple DUs, and when a user moves from a service range of one DU controlled by a current CU to a service range of another DU controlled by the current CU, the user needs to switch from a current DU to a target DU. And this DU switching under the control of an intra-CU may be frequent because DUs are densely deployed.

In the intra-CU DU switching process of option 2, since the RLC function is disposed in the DU, after the user switches from a source DU to the target DU, during the downlink data transmission process, data in a send buffer of the RLC in the source DU may be cleared, thus RLC PDU data on the source DU that is not successfully sent may be lost. The target DU to which the user is switched is not aware of which RLC PDU data on the source DU is not successfully transmitted.

In the intra-CU DU switching process of option 3, since a part of the RLC functions are disposed in the DU and another part of the RLC functions including the RLC ARQ are disposed in the CU, after the user switches from the source DU to the target DU, since an existing RLC status report is not in real-time but controlled by RLC poll, a status report transmission mechanism, and a status prohibit timer in order to save a status report transmission resource, there usually exists a long gap between status report transmissions. Then after switching to the target DU under option 3, a transmitting-end CU may not initiate real-time polling, or a user RLC may not report the RLC status report to the CU in time, or a latest RLC status report is lost in a DU link switching process. Therefore, the CU cannot discover in time RLC PDU data needing to be retransmitted, and consequently, transmission latency of the user is increased and even packet loss may be caused.

In summary, during the intra-CU DU switching, there are risks that the retransmission latency of downlink RLC PDU data is increased and RLC PDU data may be lost in both option 2 and option 3. If the data transmission RLC of the user is configured in an AM mode, loss of such RLC PDU data during the switching between DUs will have a serious negative impact on the service quality for the user. The above downlink RLC PDU data loss during DU switching is similar in single connection (the UE connected to one DU), dual-connection or multiple-connection (UE connected to two or more DUs at the same time).

In view of the above, under the CU-DU architecture in related technology, downlink data loss is easily to occur when the user switches between DUs under the same CU, which does not satisfy the requirement of seamless switching. To solve the problem, the present application provides a data transmission scheme, which is suitable for a process of switching between DUs by a user under a CU-DU networking architecture, and can solve the problem that data loss of downlink RLC PDUs may easily occur when the user switches between DUs under the same CU in a CU-DU architecture of 5G during a data transmission process under the acknowledged mode.

Embodiment 1

An embodiment is applicable to a CU-DU networking architecture shown in FIG. 1.

Figure 4:
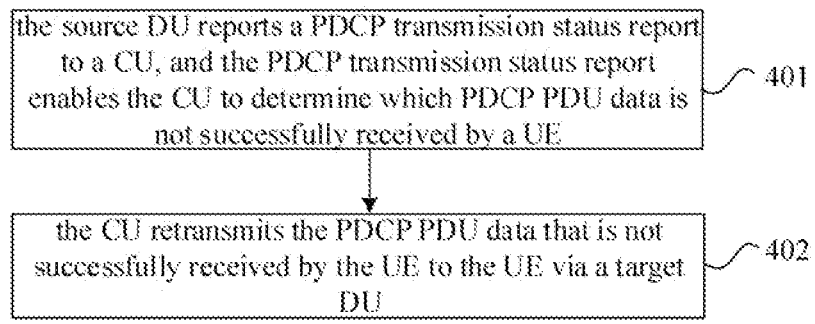
FIG. 4 is a flowchart of a method applied to a UE according to embodiment 1 of the present application.

A data transmission method, applied to a source DU, as shown in FIG. 4, includes 2 steps as described below.

In step 401, the source DU reports a PDCP transmission status report to a CU, and the PDCP transmission status report enables the CU to determine which PDCP PDU data is not successfully received by a UE.

In step 402, the CU retransmits the PDCP PDU data that is not successfully received by the UE to the UE via a target DU.

In an implementation manner, the CU sends the PDCP PDU data that is not successfully received by the UE to the target DU, to send the PDCP PDU data that is not successfully received by the UE to the UE via the target DU.

Figure 5:
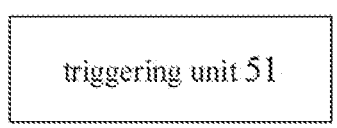
FIG. 5 is a schematic structural diagram of a data transmission apparatus applied to the UE according to embodiment 1 of the present application.

A data transmission apparatus, applied to the source DU, as shown in FIG. 5, includes:

a triggering unit 51, used for reporting the PDCP transmission status report to the CU, and the PDCP transmission status report enables the CU to determine which PDCP PDU data is not successfully received by the UE and retransmit the PDCP PDU data which is not successfully received by the UE to the UE via the target DU.

A data transmission apparatus includes a processor and a memory and is applied to the UE, and the memory is used for storing computer-executable instructions which, when executed by the processor, implement a step of:

reporting the PDCP transmission status report to the CU, where the PDCP transmission status report enables the CU to determine which PDCP PDU data is not successfully received by the UE and retransmit the PDCP PDU data which is not successfully received by the UE to the UE via a target DU.

A data transmission method, applied to a target DU, as shown in FIG. 6, may include a step as described below.

In step 601, the target DU acquires PDCP PDU data which is not successfully received by the UE and retransmits the acquired PDCP PDU data to the UE.

In an implementation manner, the target DU acquiring the PDCP PDU data that is not successfully received by the UE and retransmitting the PDCP PDU data to the UE include:

the target DU receives and caches the PDCP PDU data from a CU; and the target DU retransmits the PDCP PDU data which is not successfully received by the UE in the cached PDCP PDU data to the UE.

In another implementation manner, the target DU acquiring the PDCP PDU data that is not successfully received by the UE and retransmitting the PDCP PDU data to the UE include:

the target DU receives and caches the PDCP PDU data which is sent by the CU and not successfully received by the UE; and the target DU retransmits the cached PDCP PDU data to the UE.

A data transmission apparatus, applied to the target DU, as shown in FIG. 7, may include:

a first receiving unit 71, used for acquiring PDCP PDU data which is not successfully received by the UE; and a first sending unit 72, used for retransmitting the PDCP PDU data which is not successfully received by the UE to the UE.

In an implementation manner, the first receiving unit 71 is used for receiving and caching the PDCP PDU data from the CU; and the first sending unit 72 is used for resending the PDCP PDU data which is not successfully received by the UE in the cached PDCP PDU data to the UE.

In another implementation manner, the first receiving unit 71 is used for receiving and caching the PDCP PDU data which is sent by the CU and not successfully received by the UE; and the first sending unit 72 is used for resending the cached PDCP PDU data to the UE.

A data transmission apparatus includes a processor and a memory and is applied to the DU, and the memory is configured to store computer-executable instructions which, when executed by the processor, implement a step of:

acquiring PDCP PDU data which is not successfully received by the UE and retransmitting the acquired PDCP PDU data to the UE.

A data transmission method, applied to the CU, as shown in FIG. 8, may include steps as described below.

In step 801, the CU receives the PDCP transmission status report, and the PDCP status report enables the CU to determine which PDCP PDU data is not successfully received by the UE.

In step 802, the CU acquires the PDCP PDU data that is not successfully received by the UE according to the PDCP transmission status report and resends the acquired PDCP PDU data to the target DU, and retransmits the PDCP PDU data that is not successfully received by the UE to the UE via the target DU.

In an implementation manner, the CU acquiring the PDCP PDU data which is not successfully received by the UE according to the PDCP transmission status report and retransmitting the acquired PDCP PDU data to the target DU include:

the CU caches the PDCP PDU data; and the CU resends the PDCP PDU data which is not successfully received by the UE in the cached PDCP PDU data to the target DU according to the PDCP status report.

Figure 9:
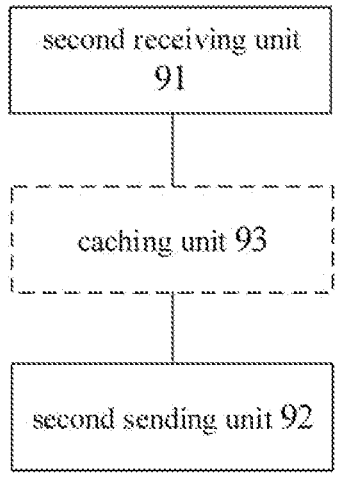
FIG. 9 is a schematic structural diagram of a data transmission apparatus applied to the CU according to embodiment 1 of the present application.

A data transmission apparatus, applied to the CU, as shown in FIG. 9, may include:

a second receiving unit 91, used for receiving the PDCP transmission status report, and the PDCP status report enables the CU to determine which PDCP PDU data is not successfully received by the UE; and a second sending unit 92, used for acquiring PDCP PDU data which is not successfully received by the UE and resending the acquired PDCP PDU data to the target DU according to the PDCP transmission status report.

In an implementation manner, the apparatus further includes:

a caching unit 93, used for caching the PDCP PDU data which is not successfully received by the UE; and the second sending unit 92 is used for resending the PDCP PDU data which is not successfully received by the UE in the cached PDCP PDU data to the target DU according to the PDCP status report.

A data transmission apparatus includes a processor and a memory and is applied to the CU, and the memory is configured to store computer-executable instructions which, when executed by the processor, implement steps of:

the PDCP transmission status report is received, and the PDCP status report enables the CU to determine which PDCP PDU data is not successfully received by the UE; and the PDCP PDU data which is not successfully received by the UE is acquired and resent to the target DU according to the PDCP transmission status report.

In the present embodiment, the intra CU may send data to the target DU in advance when switching between DUs, so that the target DU can retransmit the corresponding data to the UE. Specifically, when a network side determines that switching may be performed between DUs, or the network side is preparing for switching between DUs, the CU may send, in advance of a period of time, an identical copy (with the same Sequence (SN) number and content) to the target DU while sending PDCP PDU data to the source DU. Thus, when completing the switching and after receiving the PDCP status report, the target DU can directly acquire the PDCP status that is not successfully received by the UE according to the PDCP status report, and retransmit the corresponding PDCP PDU data cached in the target DU by the CU in advance to the UE, thereby reducing the retransmission latency.

In some implementation manners, if the UE does not support the function of actively triggering the PDCP status report after the DU switching is completed, the CU may send PDCP polling to the UE during the switching, and request the UE to report the PDCP status report. Specifically, before the network side determines that a switching needs to be performed between DUs of the intra CU, the CU may send a PDCP polling packet to the UE, and after receiving the PDCP polling packet, the UE may report a PDCP status report to the network side. After receiving the PDCP status report, the CU may simultaneously send newly transmitted data and the PDCP PDU data that is not successfully received by the UE to the source DU and the target DU, thus reducing the redundancy of data cached in the target DU in advance.

In some implementation manners, in order to reduce redundancy of data transmitted in advance, the source DU may be aware of which PDCP PDU data is not successfully transmitted according to the RLC status report fed back by the UE, accordingly, the source DU may construct a PDCP status report and transmit the constructed PDCP status report to the CU, and after receiving the PDCP status report, the CU may simultaneously send newly transmitted data and the PDCP PDU data that is not successfully received by the UE to the source DU and the target DU, so that the target DU transmits the corresponding PDCP PDU data to the UE, thereby avoiding packet loss.

According to the above-mentioned data transmission method and apparatus of the present embodiment, the UE actively triggers the PDCP report and sends the PDCP report to the target DU, and the target DU may acquire the PDCP PDU data which is not successfully received by the UE according to the PDCP report and retransmit the acquired PDCP PDU data to the UE, so that a problem that the downlink PDCP PDU data is easily lost due to the switching among DUs under the same CU is solved, and a seamless switching requirement of the user is satisfied.

In addition, in the embodiment, the CU sends the PDCP PDU data that is not successfully received by the UE to the target DU in advance and caches the PDCP PDU data, and after the DU switching is completed, the target DU may directly acquire the corresponding PDCP PDU data from the cache according to the PDCP status report and retransmit the PDCP PDU data to the UE, thereby solving the problem of large downlink data retransmission latency.

Embodiment 2

An embodiment is applicable to a CU-DU networking architecture shown in FIG. 2.

Figure 10:
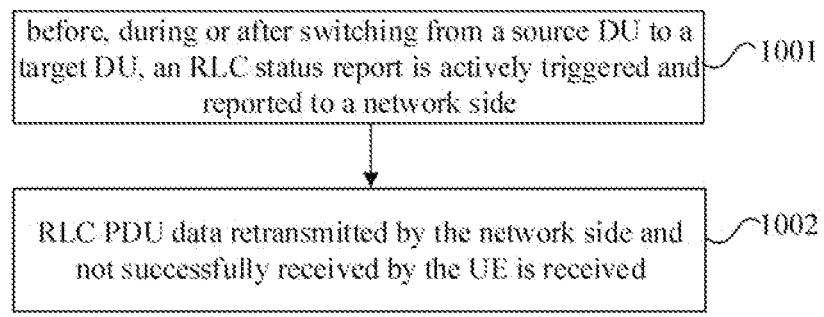
FIG. 10 is a flowchart of a method applied to a UE according to embodiment 2 of the present application.

A data transmission method, applied to a UE, as shown in FIG. 10, includes 2 steps as described below.

In step 1001, before, during or after switching from a source DU to a target DU, an RLC status report is actively triggered and reported to a network side, and the RLC status report is used to indicate which RLC PDU data is not successfully received by the UE.

In step 1002, RLC PDU data retransmitted by the network side and not successfully received by the UE is received.

Figure 11:
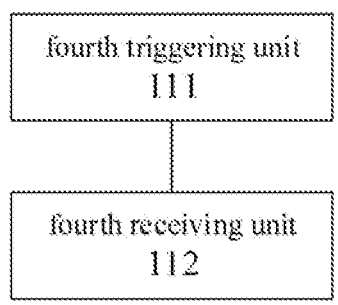
FIG. 11 is a schematic structural diagram of a data transmission apparatus applied to the UE according to embodiment 2 of the present application.

A data transmission method, applied to a UE, as shown in FIG. 11, includes:

a fourth triggering unit 111, used to, before, during or after switching from the source DU to the target DU, actively trigger and report a RLC status report to a network side, and the RLC status report is used to indicate which RLC PDU data is not successfully received by the UE; and a fourth receiving unit 112, used to receive RLC PDU data retransmitted by the network side and not successfully received by the UE.

A data transmission apparatus includes a processor and a memory and is applied to the UE, and the memory is configured to store computer-executable instructions which, when executed by the processor, implement steps of:

before, during or after switching from the source DU to the target DU, actively triggering and reporting an RLC status report to the network side, and the RLC status report is used to indicate which RLC PDU data is not successfully received by the UE; and receiving RLC PDU data retransmitted by the network side and not successfully received by the UE.

Figure 12:
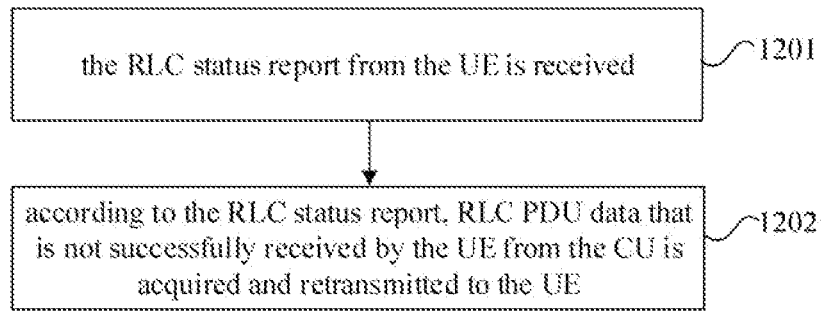
FIG. 12 is a flowchart of a method applied to a DU according to embodiment 2 of the present application.

A data transmission method, applied to a DU, as shown in FIG. 12, includes 2 steps as described below.

In step 1201, the RLC status report from the UE is received, where the RLC status report is used to indicate which RLC PDU data is not successfully received by the UE.

In step 1202, according to the RLC status report, RLC PDU data that is not successfully received by the UE from the CU is acquired and retransmitted to the UE.

In an implementation manner, the acquiring, from the CU, RLC PDU data that is not successfully received by the UE and retransmitting the acquired RLC PDU data to the UE in step 1202 according to the RLC status report may include: the RLC status report is passed through to the CU; RLC PDU data which is not successfully received by the UE and comes from the CU is received; and the RLC PDU data which is not successfully received by the UE is retransmitted to the UE.

In an implementation manner, the acquiring, from the CU, RLC PDU data that is not successfully received by the UE and retransmitting the acquired RLC PDU data to the UE in step 1202 according to the RLC status report may include: the RLC status report is passed through to the CU; RLC PDU data which is not successfully received by the UE and comes from the CU is received and cached; and after the UE completes the switching to the target DU, the cached RLC PDU data is retransmitted to the UE.

Figure 13:
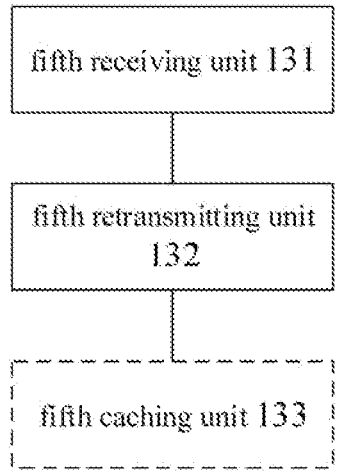
FIG. 13 is a schematic structural diagram of a data transmission apparatus applied to the DU according to embodiment 2 of the present application.

A data transmission apparatus, applied to the DU, as shown in FIG. 13, may include:

a fifth receiving unit 131, used to receive the RLC status report from the UE, and the RLC status report is used to indicate which RLC PDU data is not successfully received by the UE; and a fifth retransmitting unit 132, used to acquire the RLC PDU data that is not successfully received by the UE from the CU and retransmit the acquired RLC PDU data to the UE according to the RLC status report.

In an implementation manner, the fifth retransmitting unit 132 is specifically used to pass through the RLC status report to the CU, receive the RLC PDU data, from the CU, which is not successfully received by the UE, and retransmit the RLC PDU data that is not successfully received by the UE to the UE.

In another implementation manner, the data transmission apparatus may further include: a fifth caching unit 133, used to receive and cache the RLC PDU data, from the CU, which is not successfully received by the UE; the fifth retransmitting unit 132 is specifically used to pass through the RLC status report to the CU, and retransmit the RLC PDU data cached in the fifth caching unit to the UE after the UE completes the switching to the target DU.

A data transmission apparatus includes a processor and a memory and is applied to the DU, and the memory is configured to store computer-executable instructions which, when executed by the processor, implement steps of:

receiving the RLC status report from the UE, where the RLC status report is used to indicate which RLC PDU data is not successfully received by the UE; and according to the RLC status report, acquiring RLC PDU data that is not successfully received by the UE from the CU and retransmitting the acquired RLC PDU data to the UE.

Figure 14:
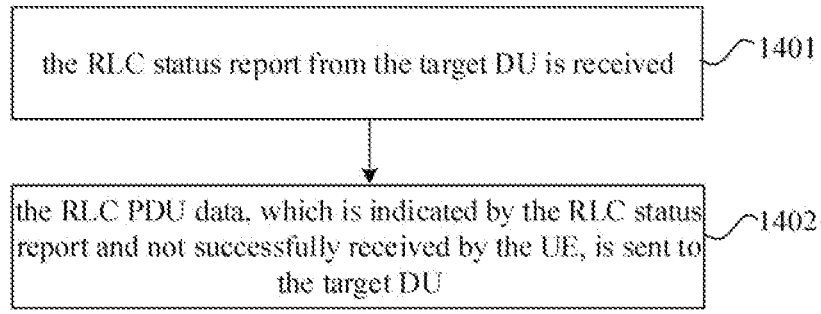
FIG. 14 is a flowchart of a method applied to the CU according to embodiment 2 of the present application.

A data transmission method, applied to the CU, as shown in FIG. 14, may include steps as described below.

In step 1401, the RLC status report from the target DU is received, where the RLC status report is used to indicate which RLC PDU data is not successfully received by the UE.

In step 1402, the RLC PDU data, which is indicated by the RLC status report and not successfully received by the UE, is sent to the target DU.

Figure 15:
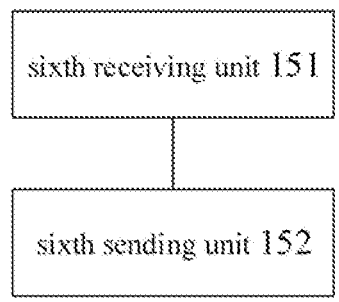
FIG. 15 is a schematic structural diagram of a data transmission apparatus applied to the CU according to embodiment 2 of the present application.

A data transmission apparatus, applied to the CU, as shown in FIG. 15, may include:

a sixth receiving unit 151, used to receive the RLC status report from the target DU, and the RLC status report is used to indicate which RLC PDU data is not successfully received by the UE; and a sixth sending unit 152, used to send the RLC PDU data, which is indicated by the RLC status report and not successfully received by the UE, to the target DU.

A data transmission apparatus includes a processor and a memory and may be applied to the CU, and the memory is configured to store computer-executable instructions which, when executed by the processor, implement steps of:

receiving the RLC status report from the target, where the RLC status report is used to indicate which RLC PDU data is not successfully received by the UE; and sending the RLC PDU data, which is indicated by the RLC status report and not successfully received by the UE, to the target DU.

In the present embodiment, before or after the UE switches from the source DU to the target DU, the UE may actively trigger one RLC status report to the network side, which may be used in the CU-DU architecture shown in FIG. 2, so that the network side CU may be aware of which downlink RLC data packets is not successfully transmitted and may be used for selective RLC retransmission according to the RLC status report reported by the UE.

In the present embodiment, after the target DU receives the RLC status report reported by the UE, if the target DU caches the RLC PDU data sent by the CU in advance, the target DU may directly parse the RLC status report, and selectively read the RLC PDU data that is not successfully received by the UE from the cache and retransmit the read RLC PDU data to the UE; if the target DU does not cache the RLC PDU data in advance, or the DU does not have the capability of parsing the RLC status report, the target DU may pass through the RLC status report to the CU, and the CU may parse the RLC status report and selectively retransmit the RLC PDU data that is not successfully received by the UE to the UE via the target DU.

In an implementation manner, when the UE completes the switching from the source DU to the target DU, after the CU receives the RLC status report reported by the UE, the CU may determine, according to the RLC status report, which downlink RLC PDU data is not successfully received by the UE, and the CU may selectively retransmit the RLC PDU data that is not successfully received by the UE (that is, the source DU fails to transmit) to the UE via the target DU.

In another implementation manner, the CU may send RLC PDU data to the target DU in advance during the switching of the DU, so that the target DU retransmits the corresponding RLC PDU data to the UE. Specifically, at the stage of the DU switching preparation process, if the CU receives the RLC status report reported by the UE, the CU may send in advance the RLC PDU data that is indicated to be retransmitted in the RLC status report to the target DU, and the target DU may cache the data in advance, so that after the user completes the switching to the target DU, the target DU may quickly send the RLC PDU data to the UE, thereby reducing the transmission latency.

According to the above-mentioned data transmission method and apparatus of the present embodiment, the UE actively triggers the RLC report and sends the RLC report to the target DU, and the target DU may acquire the RLC PDU data which is not successfully received by the UE according to the RLC report and retransmit the acquired RLC PDU data to the UE, so that a problem that the downlink RLC PDU data are easily lost due to the switching among DUs under the same CU is solved, and a seamless switching requirement of the user is satisfied.

In addition, in the present embodiment, the CU sends the RLC PDU data that is not successfully received by the UE to the target DU in advance and caches the RLC PDU data, and after the DU switching is completed, the target DU may directly acquire the corresponding RLC PDU data from the cache according to the RLC status report and retransmit the RLC PDU data to the UE, thereby solving the problem of large downlink data retransmission latency.

Various specific implementation manners of data transmission of the present application are described in detail below by way of examples.

EXAMPLE 1

The present example provides an acknowledged mode switching process and a data transmission flow between DUs, and is applicable to an architecture shown in FIG. 1. A CU supports initiating PDCP polling to a UE and pre-caching data to a target DU.

Figure 16:
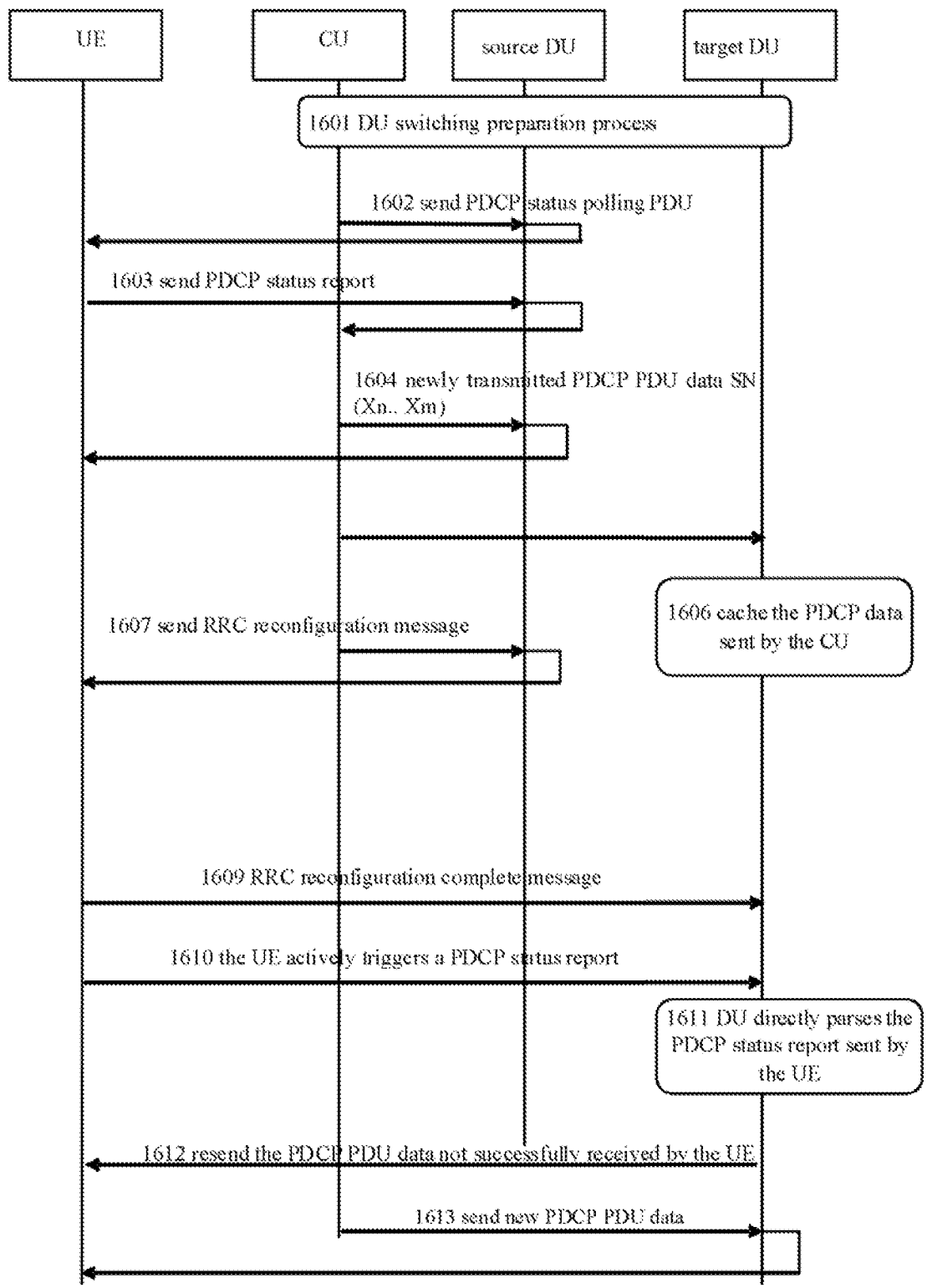
FIG. 16 is a schematic diagram of an acknowledged mode switching process among DUs and a data transmission flow in embodiment 1 of the present application.

In the present example, when preparing for the switching between the DUs, the CU may initiate PDCP polling to the UE, and pre-cache data to a target DU according to a polling result. And it is possible to relatively avoid pre-caching of PDDU PDU data, which have been successfully transmitted, in the target DU via the PDCP polling. As shown in FIG. 16, steps of the present embodiment are described as below.

In step 1601, a network side prepares to perform a switching between DUs according to a measurement result of the switching between DUs.

In step 1602, the CU sends a PDCP status polling PDU (PDCP status report Polling) data packet to the UE via a source DU.

In step 1603, after receiving the PDCP polling packet, the UE responds a PDCP status report to a network end, where the PDCP status report is used to report a data reception status of the UE at the PDCP layer.

In step 1604 to step 1605, the CU receives the PDCP status report reported by the UE, and simultaneously sends the PDCP data packet, which is indicated by the PDCP status report in the PDCP PDU data sent to the source DU and not successfully received by the UE, to the target DU.

The New PDUS SN (Xn.. Xm) labeled in FIG. 16 is the PDCP PDU data newly transmitted by the CU to the source DU, and the Unacknowledged PDCP PDU data S SN (Yn.. Ym) labeled in FIG. 16 is the PDCP PDU data that has not been successfully received by the UE.

In step 1606, the target DU receives and caches data sent by the CU in advance.

In step 1607, after completing the data pre-caching of the target DU and the preparation work for the switching of the target DU, the network side issues a RRC reconfiguration message to the UE via the source DU, and informs the UE to perform the switching of the DUs.

Optionally, the present embodiment further includes steps as described below. In step 1608 (not shown in the figure), the UE performs switching from the source DU to the target DU.

In step 1609, after the switching from the UE to the target DU is completed, the UE sends the RRC reconfiguration complete message to the target DU.

In step 1610, after the switching from the UE to the target DU is completed, the UE actively triggers a PDCP status report and sends the triggered PDCP status report to the target DU, where the PDCP status report is used to inform the network side of which PDCP PDU data is not successfully received.

In step 1611 to step 1612, the target DU receives the PDCP status report, directly parses the PDCP status report, and retransmits the PDCP PDU data that is indicated by the PDCP status report of the cached data from the CU, and not successfully received by the UE, to the UE.

In step 1613, after the switching from the UE to the target DU is completed, the CU sends new PDCP PDU data to the UE via the target DU.

Example 2

Figure 17:
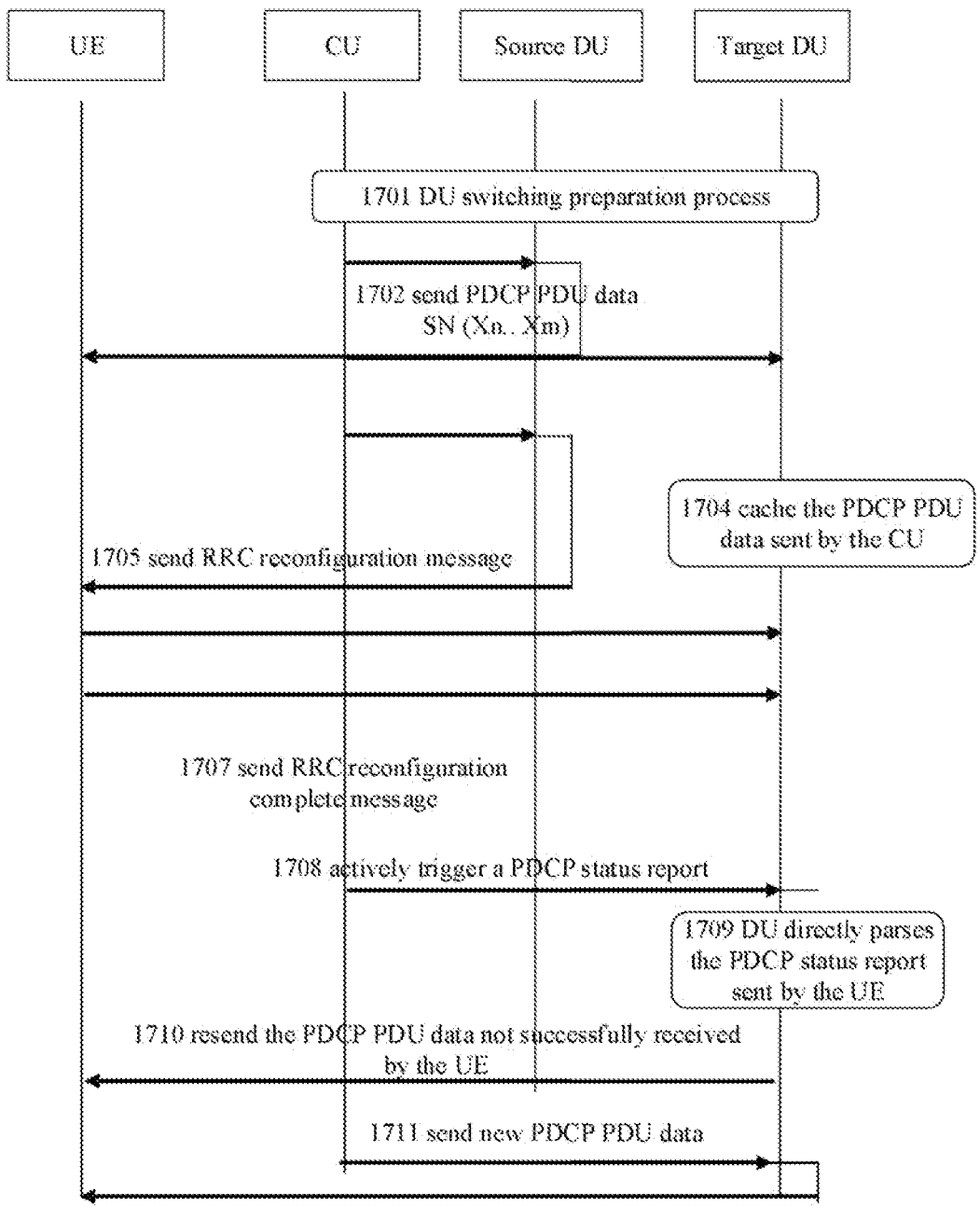
FIG. 17 is a schematic diagram of an acknowledged mode switching process among DUs and a data transmission flow in embodiment 2 of the present application.

The present example provides an acknowledged mode switching process and a data transmission flow between DUs, and is applicable to an architecture shown in FIG. 1. And a CU supports a target DU pre-caching data. The difference between the present example and Example 1 is that the CU may not initiate a PDCP status polling procedure to a user in the present example, but directly cache data to the target DU a period of time earlier in the switching preparation procedure, as shown in FIG. 17, steps of the present example are as follows:

In step 1701, a network side prepares to perform switching between DUs according to a measurement result of the switching between DUs;

In steps 1702 to 1703, the CU also simultaneously sends a copy of PDCP PDU data directly sent to a source DU to the target DU in advance, and the SN (Xn..Xm) labeled in FIG. 17 indicates the data.

In step 1704, the target DU receives and caches the PDCP PDU data sent by the CU in advance; and In step 1705, after completing data pre-caching of the target DU and preparation work for the switching of the target DU, the network side issues a RRC reconfiguration message to the UE via the source DU, and informs the UE to perform the switching of the DU.

Optionally, the present embodiment further includes steps as described below. In step 1706 (not shown in the figure), the UE performs switching from the source DU to the target DU.

In step 1707, after the switching from the UE to the target DU is completed, the UE sends the RRC reconfiguration complete message to the target DU.

In step 1708, after the switching from the UE to the target DU is completed, the UE actively triggers a PDCP status report and sends the triggered PDCP status report to the target DU, where the PDCP status report is used to inform the network side of which PDCP PDU data is not successfully received.

In step 1709 to step 1710, the target DU receives the PDCP status report, directly parses the PDCP status report, and retransmits the PDCP PDU data that is indicated by the PDCP status report of the pre-cached PDCP PDU data and not successfully received by the UE, to the UE.

In step 1711, after the switching from the UE to the target DU is completed, the CU sends new PDCP PDU data to the UE via the target DU.

Example 3

Figure 18:
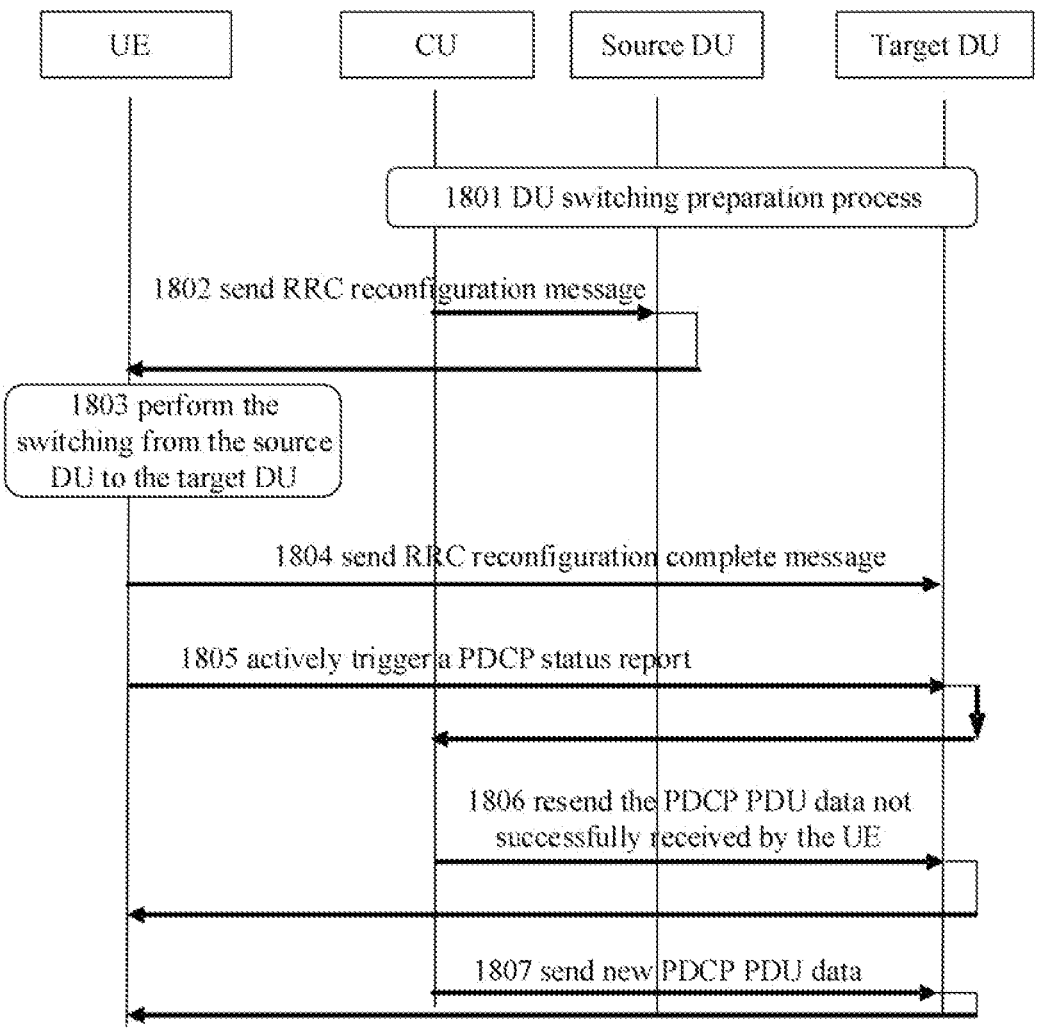
FIG. 18 is a schematic diagram of an acknowledged mode switching process among DUs and a data transmission flow in embodiment 3 of the present application.

The present example provides an acknowledged mode switching process and a data transmission flow between DUs, and is applicable to an architecture shown in FIG. 1. The difference between the present example and Examples 1 and Examples 2 is that the CU in the present example can complete the data-loss-free switching between DUs without initiating a PDCP status polling procedure to a user and caching data in advance to the target DU. As shown in FIG. 18, steps of the present embodiment are described as below.

In step 1801, a network side prepares to perform switching between DUs according to a measurement result of the switching between DUs.

In step 1802, the network side issues a RRC reconfiguration message to a UE via a source DU, and informs the UE to perform DU switching.

In step 1803, the UE performs switching from the source DU to the target DU.

In step 1804, after the switching from the UE to the target DU is completed, the UE sends an RRC reconfiguration complete message to the target DU.

In step 1805, after the switching from the UE to the target DU is completed, the UE actively triggers a PDCP status report and sends the triggered PDCP status report to the target DU, where the PDCP status report is used to inform the network side of which PDCP PDU data is not successfully received. After receiving the PDCP status report, the target DU passes through the PDCP status report to the CU.

In step 1806, the CU retransmits the PDCP PDU data that is indicated by the PDCP status report and not successfully received by the UE to the UE via the target DU according to the received PDCP status report.

In step 1807, after the switching from the UE to the target DU is completed, the CU sends new PDCP PDU data to the UE via the target DU.

Example 4

Figure 19:
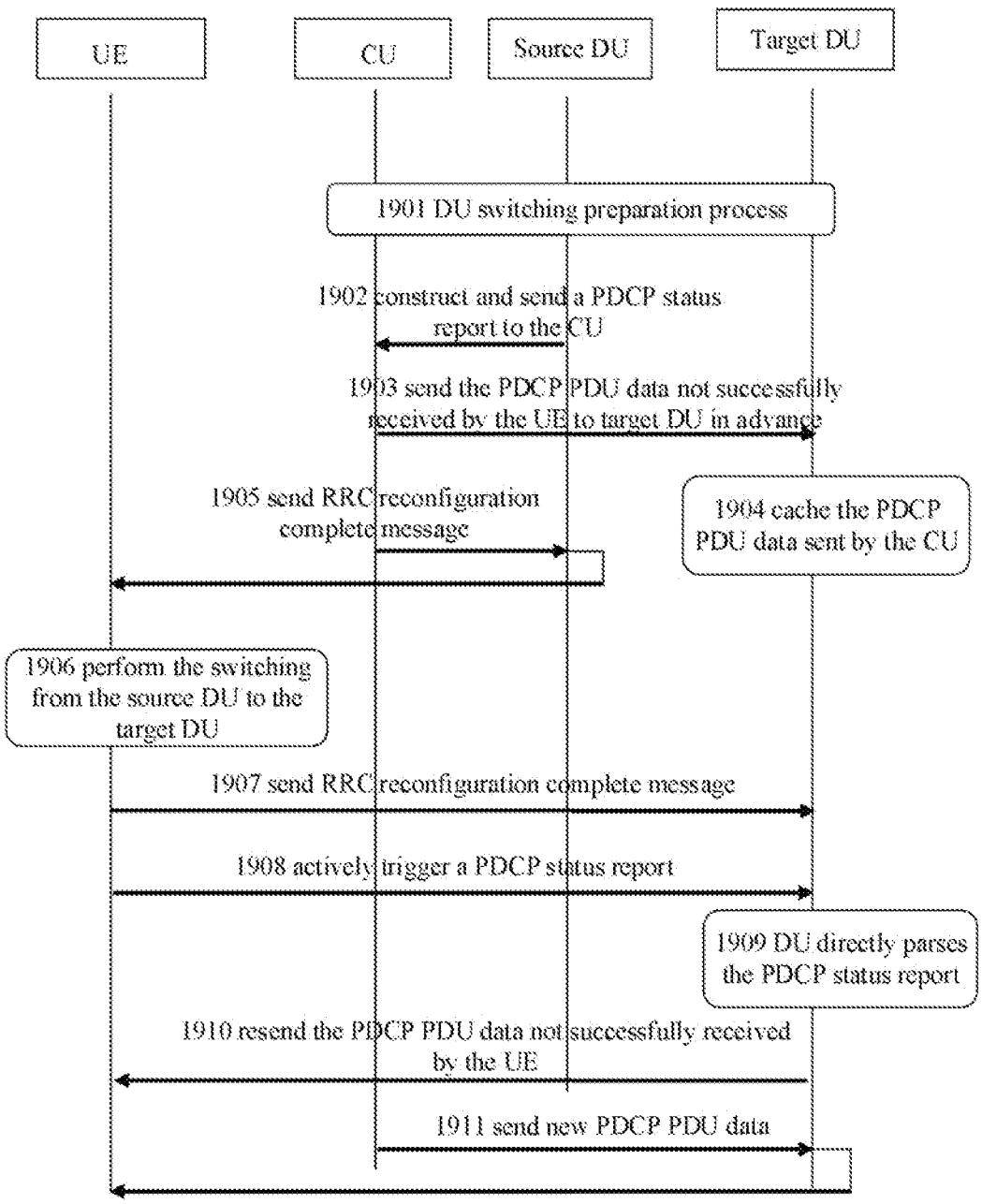
FIG. 19 is a schematic diagram of an acknowledged mode switching process among DUs and a data transmission flow in embodiment 4 of the present application.

The present example provides an acknowledged mode switching process and a data transmission flow between DUs, and is applicable to an architecture shown in FIG. 1. The difference between the present example and the previous example is that the DU in the present example supports a UE to be aware of which PDCP PDU data of the DU is not successfully received by the UE according to the transmission status of the downlink PDCP PDU data by the DU and the RLC status report feedback, and construct the PDCP status report to feed back the transmission status of the current PDCP to the CU. As shown in FIG. 19, steps of the present embodiment are described as below.

In step 1901, a network side prepares to perform the switching between DUs according to a measurement result of the switching between DUs.

In step 1902, in the switching preparation process, the source DU may be aware of which PDCP PDU data of the DU is not successfully received by the UE according to transmission status of the downlink PDCP PDU data by the source DU and a RLC status report fed back by the UE, and construct a PDCP status report and send the constructed PDCP status report to the CU to feed back the current PDCP transmission status to the CU.

In step 1903, the CU sends PDCP PDU data that have not been sent by the source DU and PDCP PDU data that have been sent but not successfully received by the UE to the target DU according to the PDCP status report reported by the source DU.

In step 1904, the target DU receives and caches data sent by the CU in advance.

In step 1905, the network side issues a RRC reconfiguration instruction to the UE via the source DU, and informs the UE to perform DU switching.

In step 1906, the UE performs switching from the source DU to the target DU.

In step 1907, after the switching from the UE to the target DU is completed, the UE sends a RRC reconfiguration complete message to the target DU.

In step 1908, after the switching from the UE to the target DU is completed, the UE actively triggers the PDCP status report and sends the triggered PDCP status report to the target DU, where the PDCP status report is used to inform the network side of which PDCP PDU data is not successfully received.

In step 1909, after receiving the PDCP status report, the target DU may directly parses the PDCP status report.

In step 1910, the DU retransmits the PDCP PDU data that is indicated by the PDCP status report in the pre-cached data and not successfully received by the UE to the UE according to a parsed PDCP status report content.

In step 1911, after the switching from the UE to the target DU is completed, the CU sends new PDCP PDU data to the UE via the target DU.

Example 5

Figure 20:
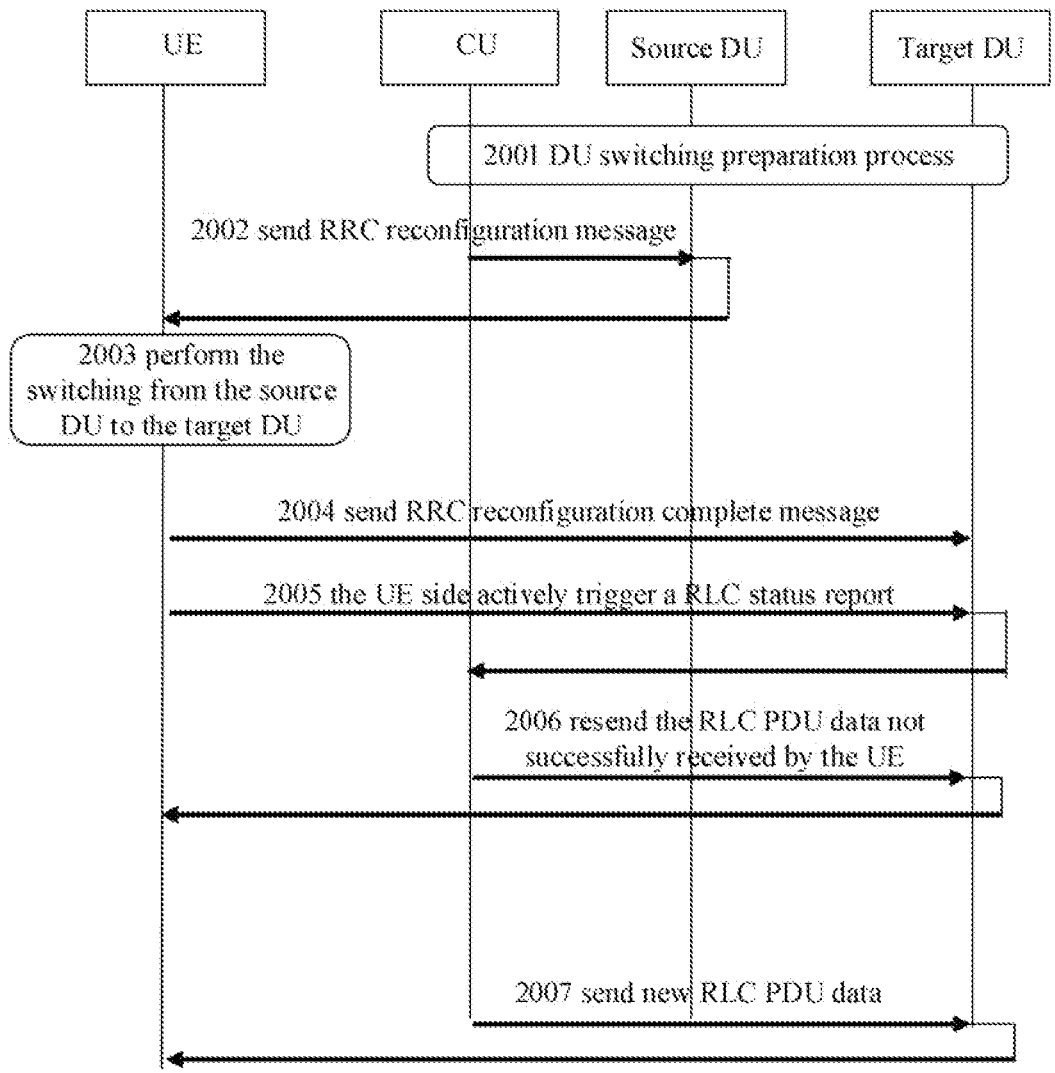
FIG. 20 is a schematic diagram of an acknowledged mode switching process among DUs and a data transmission flow in embodiment 5 of the present application.

The present example provides an acknowledged mode switching process and a data transmission flow between DUs, and is applicable to an architecture shown in FIG. 2. And after the switching is completed, a UE side actively triggers an RLC status report to a network side, as shown in FIG. 20, steps of the present example are as follows.

In step 2001, a network side prepares to perform switching between DUs according to a measurement result of the switching between DUs.

In step 2002, the network side issues a RRC reconfiguration message to a UE via a source DU, and informs the UE to perform the DU switching.

In step 2003, the UE performs switching from the source DU to the target DU.

In step 2004, after the switching from the UE to the target DU is completed, the UE sends a RRC reconfiguration complete message to the target DU.

In step 2005, after the switching from the UE to the target DU is completed, an RLC layer of the UE actively triggers the RLC status report and sends the triggered RLC status report to the target DU, so as to inform the network side of which RLC PDU data are successfully received by the UE, and the target DU directly passes through the RLC status report to the CU after receiving the RLC status report.

In step 2006, the CU receives an RLC status report forwarded by the target DU, and retransmits the RLC PDU data that is indicated by the RLC status report and not successfully received by the UE, to the UE via the target DU.

In step 2007, after the switching from the UE to the target DU is completed, the CU sends new RLC PDU data to the UE via the target DU.

Example 6

Figure 21:
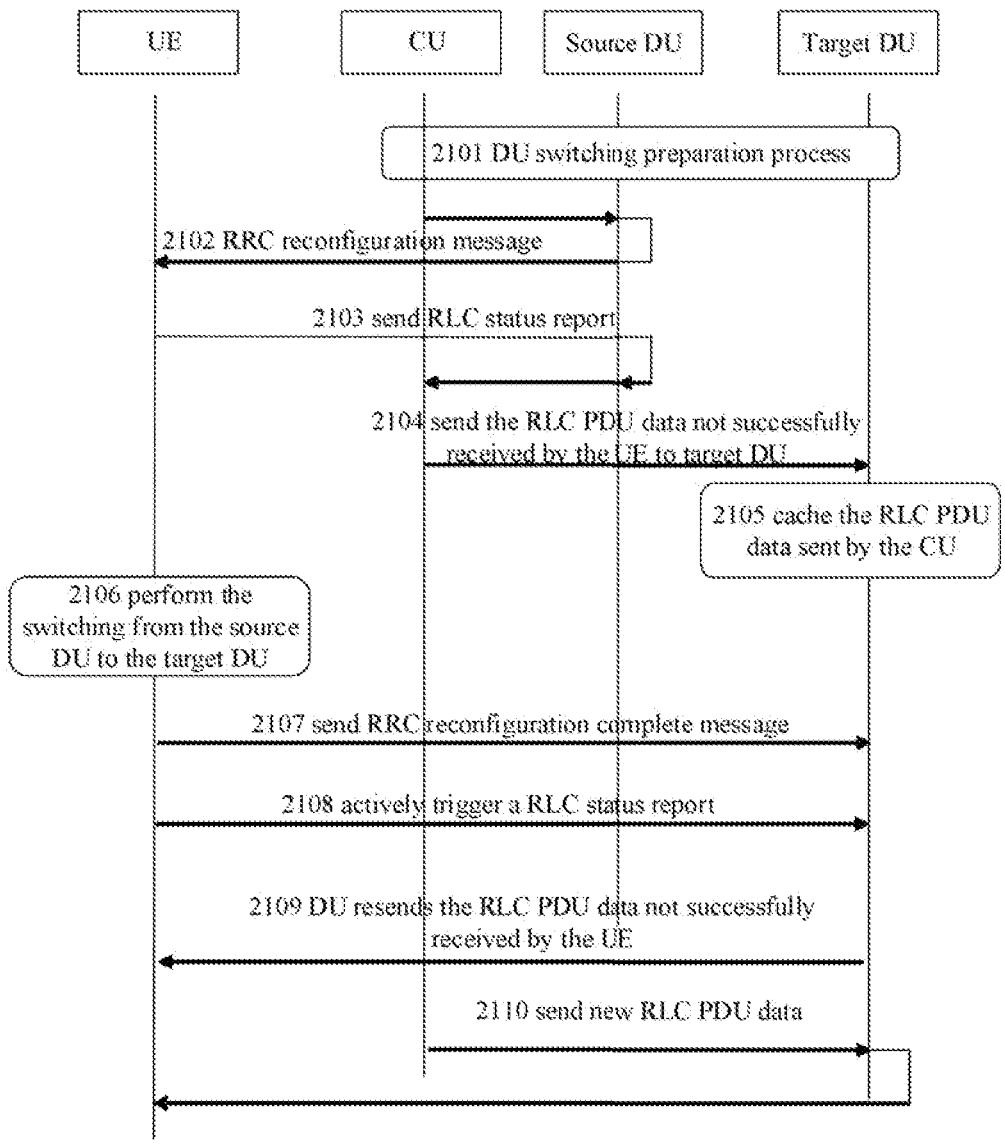
FIG. 21 is a schematic diagram of an acknowledged mode switching process among DUs and a data transmission flow in embodiment 6 of the present application.

The present example provides an acknowledged mode switching process and a data transmission flow between DUs, and is applicable to an architecture shown in FIG. 2. And before the switching is completed, a UE side actively triggers an RLC status report to a network side, as shown in FIG. 21, steps of the present example are as follows.

In step 2101, a network side prepares to perform switching between DUs according to a measurement result of the switching between DUs.

In step 2102, the network side issues a RRC reconfiguration instruction to the UE via a source DU, and informs the UE to perform DU switching.

In step 2103, after receiving an RRC reconfiguration message (DU switching) sent by the network side, the UE actively triggers an RLC status report and sends the triggered RLC status report to the network side.

In step 2104, the CU receives the RLC status report reported by the UE, and sends RLC PDU data, in the RLC status report, indicated to be not successful received by the UE to target DU in advance.

In step 2105, the target DU receives and caches the RLC PDU data sent by the CU in advance.

In step 2106, the UE performs switching from the source DU to the target DU.

In step 2107, after the switching from the UE to the target DU is completed, the UE sends a RRC reconfiguration complete message to the target DU.

In step 2108, after the switching from the UE to the target DU is completed, the UE actively triggers one RLC status report to the target DU.

In step 2109, after the switching from the UE to the target DU is completed, the target DU retransmits the RLC PDU data, which is not successfully received by the UE, in the pre-cached RLC PDU data to the UE according to the newly reported RLC status report reported by the UE.

In step 2110, after the switching from the UE to the target DU is completed, the CU sends new RLC PDU data to the UE via the target DU.

In addition, the embodiments of the present application further provide a computer storage medium used to store computer-executable instructions for executing the above-mentioned data transmission method applied to the UE when executed.

In addition, the embodiments of the present application further provide a computer storage medium used to store computer-executable instructions for executing the above-mentioned data transmission method applied to the CU when executed.

In addition, the embodiments of the present application further provide a computer storage medium used to store computer-executable instructions for executing the above-mentioned data transmission method applied to the DU when executed.

In the embodiments, the storage medium may include, but is not limited to, a USB flash disk, a read-only memory (ROM), a random access memory (RAM), a mobile hard disk, a magnetic disk, an optical disk or another medium capable of storing the program codes.

In the embodiments, the processor executes the steps of the method described in the above examples according to the program codes stored in the storage medium.

For specific examples in the present embodiment, reference may be made to the examples described in the above-mentioned embodiments and optional implementation modes, and the specific examples will not be repeated in the present embodiment.

It should be understood by those skilled in the art that all or some steps in the methods described above may be implemented by relevant hardware (such as a processor) as instructed by programs, and the programs may be stored in a computer storage medium, such as a ROM, a magnetic disk, or an optical disk. All or part of the steps in the embodiments described above may also be implemented by using one or more integrated circuits. Accordingly, the various modules/units in the embodiments described above may be implemented by hardware. For example, the functions of these modules/units may be implemented by one or more integrated circuits. These modules/units may also be implemented in the form of software function modules. For example, the corresponding functions of these modules/units may be implemented by using a processor to execute programs/instructions stored in a memory. The present application is not limited to any specific combination of hardware and software.

The above illustrate and describe the basic principles, main features and advantages of the present application. The present application is not limited to the embodiments described above. The above-mentioned embodiments and the specification describe only the principles of the present application. Various modifications and improvements may be made in the present application without departing from the spirit and scope of the present application. These modifications and improvements are within the scope of the present application.

INDUSTRIAL APPLICABILITY

In embodiments of the present application, a UE actively triggers a RLC report and sends the triggered RLC report to a target DU, and the target DU may acquire RLC PDU data which is not successfully received by the UE according to the RLC report and retransmit the acquired RLC PDU data to the UE, so that a problem that the downlink RLC PDU data are easily lost due to switching among DUs under an identical CU is solved, and a seamless switching requirement of a user is satisfied. Not only the problem that downlink data are easily lost due to the switching among the DUs under an identical CU, but also the problem that the retransmission latency of the downlink data is large is effectively solved.

What is claimed is:
1. A data transmission system, comprising: a source distributed unit (DU) comprising a first processor and a first storage device, a centralized unit (CU) comprising a second processor and a second storage device, and a target DU comprising a third processor and a third storage device,
wherein the source DU is configured to report a packet data convergence protocol (PDCP) transmission status report to the CU, wherein the PDCP transmission status report enables the CU to determine which PDCP protocol data unit (PDU) data is not successfully received by a user equipment (UE);

wherein the CU is configured to receive the PDCP transmission status report, acquire PDCP PDU data which is not successfully received by the UE according to the PDCP transmission status report and resend the acquired PDCP PDU data to the target DU;

wherein the target DU is configured to receive and cache the acquired PDCP PDU data sent by the CU in advance;

wherein the CU is further configured to transmit a radio resource control (RRC) reconfiguration instruction to the UE via the source DU, and inform the UE to perform DU switching;

wherein the target DU is further configured to, after the DU switching from the source DU to the target DU is completed, receive a triggered PDCP status report from the UE, wherein the triggered PDCP status report informs the target DU of the PDCP PDU data which is not successfully received by the UE; and wherein the target DU is further configured to retransmit the PDCP PDU data which is not successfully received by the UE in cached PDCP PDU data to the UE according to the triggered PDCP status report.

2. The data transmission system according to claim 1, wherein the CU is configured to cache PDCP PDU data, and resend the PDCP PDU data which is not successfully received by the UE in the cached PDCP PDU data to the target DU according to the PDCP transmission status report.

3. The data transmission system according to claim 1, wherein the PDCP transmission status report is constructed, by the source DU, based on transmission status of downlink PDCP PDU data sent by the source DU and a radio link control, RLC, status report fed back by the UE.

* * * * *